United States Patent
Moyer (10) Patent No.: US 7,296,137 B2
(45) Date of Patent: Nov. 13, 2007

(54) MEMORY MANAGEMENT CIRCUITRY TRANSLATION INFORMATION RETRIEVAL DURING DEBUGGING

(75) Inventor: William C. Moyer, Dripping Springs, TX (US)

(73) Assignee: Freescale Semiconductor, Inc., Austin, TX (US)

(*) Notice: Subject to any disclaimer, the term of this patent is extended or adjusted under 35 U.S.C. 154(b) by 280 days.

(21) Appl. No.: 11/140,176

(22) Filed: May 27, 2005

(65) Prior Publication Data

US 2006/0271759 A1 Nov. 30, 2006

(51) Int. Cl.
G06F 12/00 (2006.01)
G06F 9/45 (2006.01)

(52) U.S. Cl. .............. 711/205; 711/202; 711/203; 711/206; 711/207; 717/124; 717/136

(58) Field of Classification Search .................. None
See application file for complete search history.

(56) References Cited

U.S. PATENT DOCUMENTS

| | | | |
|---|---|---|---|
| 5,913,923 A | 6/1999 | Dunlap et al. | |
| 5,990,914 A | 11/1999 | Horan et al. | |
| 6,145,122 A | 11/2000 | Miller et al. | |
| 6,560,688 B1 | 5/2003 | Strongin et al. | |
| 6,741,254 B1 | 5/2004 | Jeddeloh | |
| 2002/0062427 A1* | 5/2002 | Chauvel et al. | 711/151 |
| 2002/0152428 A1* | 10/2002 | James et al. | 714/42 |
| 2004/0193831 A1 | 9/2004 | Moyer | |

OTHER PUBLICATIONS

Breen, Kristopher C. et al.; "Aliasing and Anti-Aliasing in Branch History Table Prediction"; ACM SIGARCH Computer Architecture News; pp. 1-4; vol. 31, No. 5; USA.
U.S. Appl. No. 11/120,272, filed May 2, 2005.
U.S. Appl. No. 11/120,287, filed May 2, 2005.
U.S. Appl. No. 11/120,288, filed May 2, 2005.

* cited by examiner

Primary Examiner—Gary Portka
Assistant Examiner—Mardochee Chery
(74) Attorney, Agent, or Firm—David G. Dolezal (57) ABSTRACT

A system for obtaining translation information from a data processing system. The system includes circuitry for receiving an external request for translation information. The circuitry determines whether the requested translation information is present in memory management circuitry of a data processing system. If the translation information is not present in the memory management circuitry, the circuitry requests retrieval of the information by a processor core. In one embodiment, the request is performed by generating an interrupt to the processor core. In other embodiments, the request is preformed by requesting the activation of a program thread to be executed by the processor core.

21 Claims, 7 Drawing Sheets

MEMORY MANAGEMENT CIRCUITRY TRANSLATION INFORMATION RETRIEVAL DURING DEBUGGING

RELATED APPLICATIONS

This application is related to the application entitled "Translation Information Retrieval" having an attorney docket number of SC13792TH, having a common inventor, having a common filing date, and having a common assignee, all of which is incorporated by reference in its entirety.

BACKGROUND OF THE INVENTION

1. Field of the Invention

This invention relates in general to a data processor and more particularly to obtaining translation information of a data processor.

2. Description of the Related Art

In some data processing systems, address translation to convert a virtual memory or I/O address to a physical memory or alternate I/O address is performed with a remapping function that accesses translation information stored e.g. in a translation lookaside buffer of a memory management unit (MMU) of a data processor.

Debugging processes are utilized e.g. in the development of code for a data processing system. Debugging processes may be implemented with an external debugger, utilizing a debug communication protocol to communicate debug information to the debugger from the data processing system. Providing debug information in real-time, without intrusion on the normal operation of the data processing system is highly desirable, in order for the actual debug operations to remain transparent to operation of the system. One example of a debug communications protocol is the IEEE ISTO-5001 NEXUS debug standard which is used by a debugger operably coupled to the data processor undergoing debug.

Many debug capabilities are defined in ISTO-5001 standard to monitor program execution by providing visibility into program flow and data flow. This visibility consists of a sequence of information messages provided over a dedicated multi-bit or multi-terminal serial interface or auxiliary port to an external development system. Program flow messages are then combined with a static image of the program to reconstruct the actual instruction execution sequence of the embedded processor. Data flow messages track processor reads and writes to pre-defined address ranges.

ISTO-5001 dynamic debug is implemented using program trace messaging including synchronization messaging, and data trace messaging. Implementation of program trace messaging requires monitoring the sequence of instruction fetches performed by the processor core in conjunction with status information which indicates change of flow (COF) events, including direct or indirect change of flow events. Direct COF events involve program counter relative branches and indirect COF events involve register indirect branches and exception vectoring. Implementation of program trace synchronization messages requires the currently executing instruction address or reasonable neighboring instruction address to be transmitted. Implementation of data trace messaging requires monitoring data access addresses and conditionally providing associated data. Data trace messaging includes read messaging or data reads within one or more defined address ranges and write messaging or data writes within one or more defined address ranges.

As part of the operation of the standard, debug messages are generated by the data processor system which contain address and data information for either program events (Program Trace Messaging), or data events (Data Read Messaging, Data Write Messaging), as well as other debug information. This address and data information is typically formatted by the debugger and presented to the user of the debugger. Correlation of the information to the program undergoing execution is an important part of the debugging process, so that actual program flow and the dynamic values of system data variables can be monitored.

In systems employing virtual memory, the user's program and data values may be placed in physical memory address locations which do not correlate with the address locations resulting from the display of the compiled or assembly program and data layout, which correspond to virtual address locations. Virtual to physical address mapping (or translation) is performed by the data processor to obtain the correct program instructions and data variable values.

However, in some embodiments, the virtual to physical mapping information is not known to an external debugger. What is needed is an improved system for providing translation information to external debugger without impacting the operation of a processor core of a data processing system.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted.

DETAILED DESCRIPTION

The following sets forth a detailed description of a mode for carrying out the invention. The description is intended to be illustrative of the invention and should not be taken to be limiting.

Figure 1:
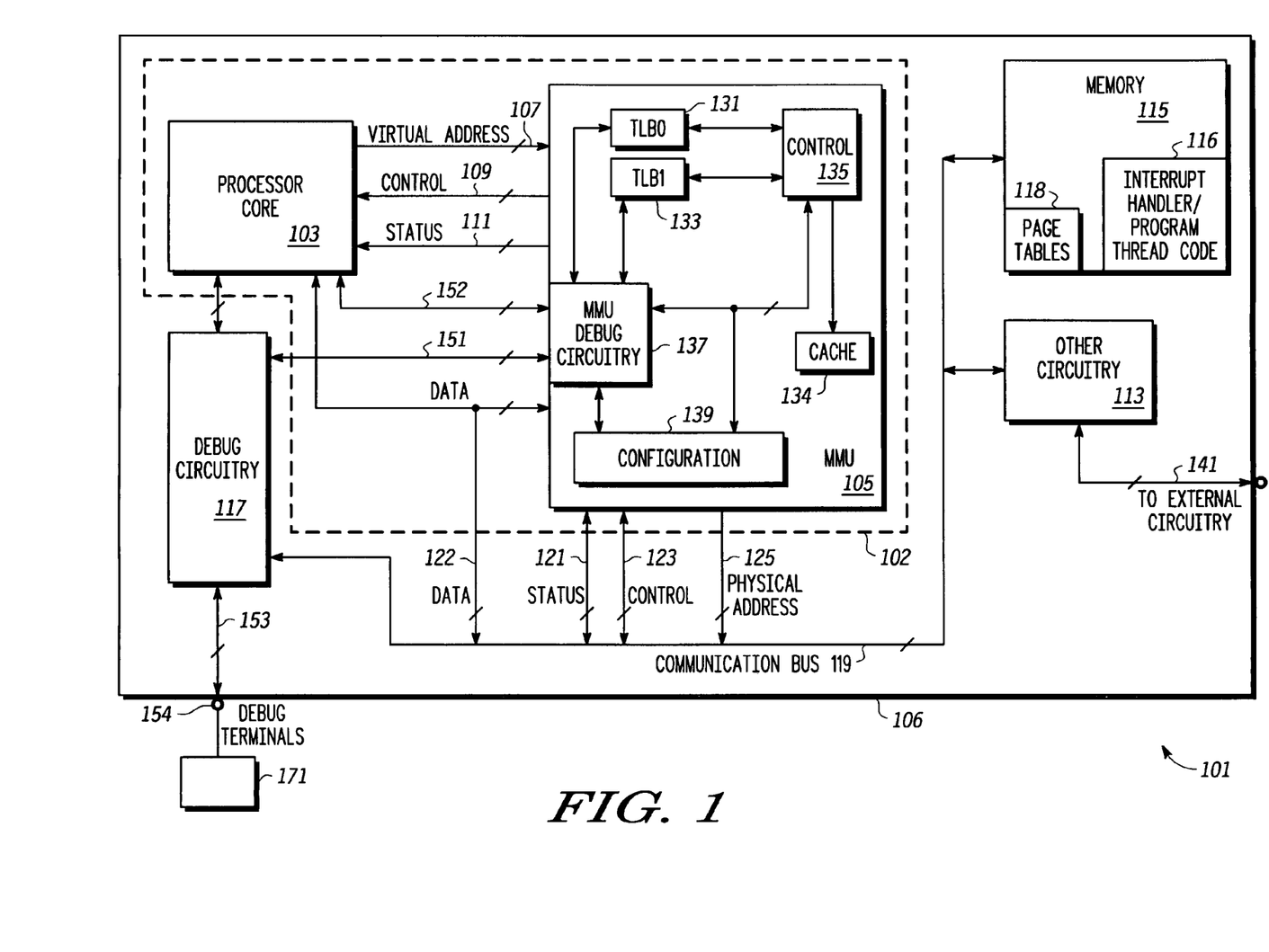
FIG. 1 is a block diagram of one embodiment of a data processing system according to the present invention.

FIG. 1 is a block diagram of a data processing system 101. In the embodiment shown, data processing system 101 includes a processor 102. Processor 102 includes a processor core 103 and a memory management unit 105 operably coupled to processor core 103 via a bus. The bus includes virtual address bus lines 107, control signal lines 109, status signal lines 111, and data signal lines 122.

System 101 includes a memory 115 (e.g. a RAM such as DRAM, SRAM, MRAM) and other circuitry 113 that is operably coupled to processor 102 via a communications bus 119. In one embodiment, communications bus 119 includes data lines 122, status lines 121, control lines 123, and physical address lines 125. Processor 102 may be coupled to external circuitry such as non volatile memories (e.g. hard drive, CD drives) via interface circuitry located in other circuitry 113. In one embodiment, other circuitry 113 may include other devices such as a ROM, general purpose I/O, UARTs, and other conventional peripheral devices. In other embodiments, other circuitry 113 may include circuitry that performs one or more other functions. As an example, other circuitry 113 may include circuitry to perform one or more of the following functions: timer function, data processing function, communication function, input/output function, memory function, analog to digital conversion, display driver function, and/or external bus interface function. Other circuitry 113 may be coupled via signals 141 in order to communicate external to data processing system 101. Some embodiments may not include other circuitry 113.

In one embodiment, data processor 102 is a CPU. In other embodiments, data processor 102 may be another type of data processor such as e.g. a digital signal processor (DSP), intelligent direct memory access (DMA) controller, graphics controller, or embedded processor.

In one embodiment, processor core 103 includes at least one instruction execution unit for executing instructions for performing processor operations. In one embodiment, the instruction execution unit includes circuitry for implementing stages of a processor pipeline. Examples of such stages includes a fetch stage, a decode stage, an execute stage, a memory data access stage, and a register write back stage. In other embodiments, processor 102 may include multiple processor cores with each having different or similar execution pipelines and functionality.

In the embodiment shown, processor 102 performs data processor operations by obtaining data and instructions from memory 115 and writing data to memory 115 and/or other circuitry 113. In one embodiment, processor core 103 executes instructions on data operands, both of which are received from memory 115. In performing these operations, processor core 103 provides a virtual address to memory management unit 105 via address lines 107. In response to a request, MMU 105 determines whether the data is in cache 134 by checking to see if the received virtual address is located in one of its translation look aside buffers (TLB) (e.g. 131, 132). If the requested data is not in cache 134, a cache miss is generated. In response to a cache miss, memory 115, I/O circuitry (e.g. of other circuitry 113), or external circuitry (e.g. via other circuitry 113) are accessed to obtain the data or instruction. In such accesses, MMU 105 translates the virtual address received from processor 102 to a physical address of a memory location or I/O circuit to receive or provide the requested data or instruction to those devices via communications bus 119. In other embodiments, other types of processors may operate in other ways and/or have other configurations.

In the embodiment shown, MMU 105 includes two TLB buffers 131 and 133, but may include a different number in other embodiments. MMU 105 may include different levels of caches as well. MMU 105 includes a control circuit 135 for controlling the operations of MMU 105.

MMU 105 includes a configuration register 139 for storing configuration information regarding MMU 105. Configuration information includes information regarding the configuration and capabilities of MMU 105. Examples of configuration information include the number of entries of a TLB, the number of TLBs, the size of the TLB's, the entry size of the TLBs, and other configuration information e.g. whether the MMU is fully associative or 2-way associative. Other types of configuration information include information regarding other capabilities of MMU 105, such as the ability to lock entries and the types of control operations available (e.g. such as flushing).

In some embodiments, the MMU may be implemented as part of the processor core 103. In some embodiments, a processor may include multiple MMUs e.g. where the processor includes multiple caches with each cache having an MMU. In some embodiments, the memory management unit may be implemented in a load store unit. In some embodiments, cache 134 is located external to MMU 105. Other embodiments may not include cache 134. Still in other embodiments, multiple caches may be implemented anywhere within or external to processor 102.

Data processing system 101 includes debug circuitry 117. In the embodiment of FIG. 1, processor 102, memory 115, other circuitry 113, and debug circuitry 117 are implemented on an integrated circuit 106. Integrated circuit 106 includes external terminals 154. Debug circuitry 117 is operably coupled to external debug circuitry 171 via external terminals 154 and signal lines 153. In the embodiment shown, circuitry 171 is external to integrated circuit 106, although in alternate embodiments, all or a portion of circuitry 171 may be contained within integrated circuit 106. In some embodiments of the present invention, debug circuitry 117 and its interaction with other portions of data processing system 101 is compliant with one or more existing standards, such as JTAG or the IEEE ISTO-5001 standard. In one embodiment, lines 153 and external debug terminals 154 implement the signaling protocols of the IEEE ISTO-5001 NEXUS standard or JTAG-TAP standard. In one embodiment, an auxiliary port of the IEEE ISTO-5001 NEXUS standard may be implemented with terminals 154.

In one embodiment, external debug circuitry 171 includes circuitry for providing debug commands and receiving debug information using terminals 154. In one embodiment, external debug circuitry 171 and debug circuitry 117 execute debugging operations as per the IEEE ISTO-5001 NEXUS standard by exchanging debug commands and program and data trace information as well as other status information associated with processor 102. In one embodiment, circuitry 171 and circuitry 117 communicate via terminals 154 and via a command and communications protocol set forth in the ISTO-5001 NEXUS standard.

Figure 2:
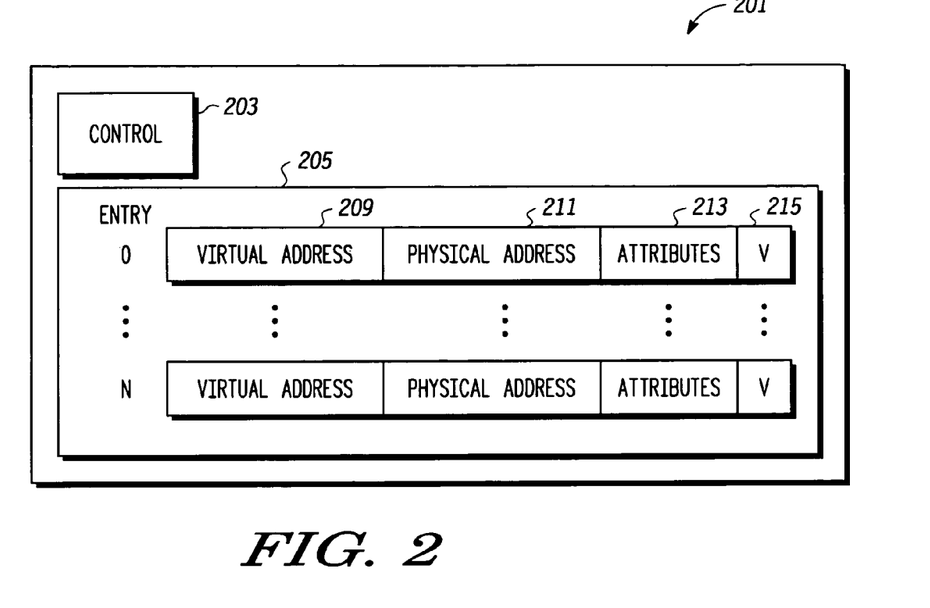
FIG. 2 is a block diagram of a translation lookaside buffer of a memory management unit.

FIG. 2 is a block diagram of a TLB (e.g. 131 or 133). TLB 201 includes a control circuit 203 and buffer 205. Buffer 205 includes a plurality of entries (shown as entries 0-N in FIG. 2). Each entry includes a virtual address field 209, a physical address field 211, an attributes field 213, and a valid ("V")

field 215 indicating validity of the entry information. Field 209 includes the virtual address of the entry and field 211 includes the associated physical address translation of the virtual address located in virtual address field 209 of that entry. Attributes field 213 includes attribute information associated with the information stored in the address location including e.g. whether the memory location as designated by the physical addresses is restricted or whether the data associated with entry can be accessed by another processor operation. Other types of attribute information include write-protection, cacheability, memory coherence (or shared), the level of privilege required to allow access to locations mapped by the entry, whether information corresponding to the range of addresses has been modified, and other characteristics of the locations corresponding to the range of addresses mapped by the entry.

Figure 3:
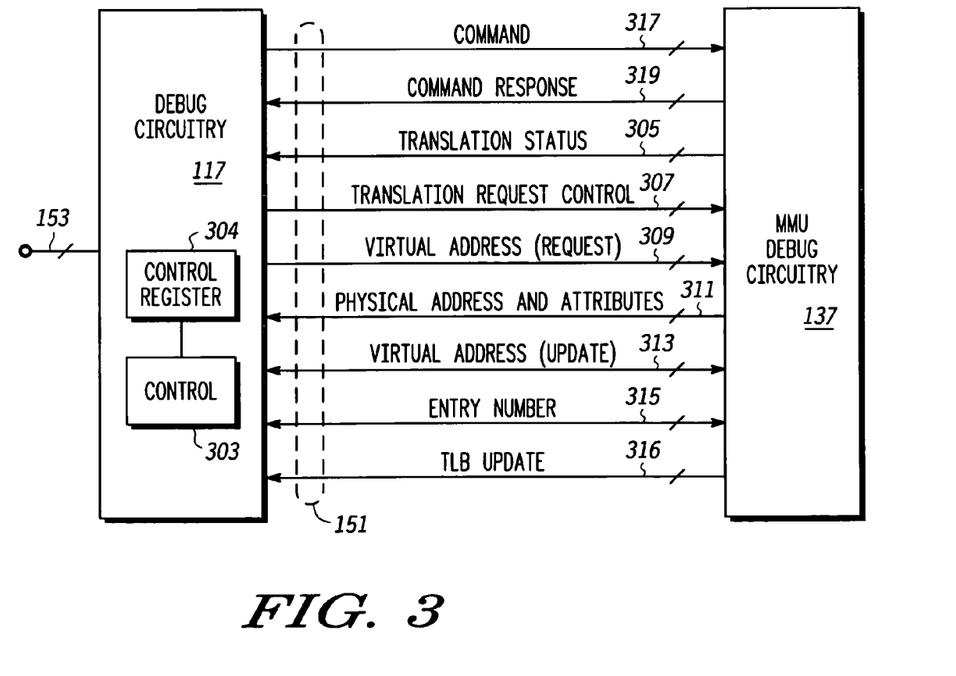
FIG. 3 is a block diagram of one embodiment illustrating the coupling of signal lines between debug circuitry according to the present invention.

FIG. 3 is a block diagram further illustrating the signals of bus 151 between debug circuitry 117 and MMU debug circuitry 137 according to one embodiment of the present invention. In the embodiment shown, bus 151 includes command lines 317 (which are unidirectional from circuitry 117 to circuitry 137 in the embodiment shown) for carrying command signals from circuitry 117 to circuitry 137. Bus 151 also includes command response signal lines 319 for carrying the command response signals from circuitry 137 to circuitry 117, translation status lines 305 for carrying the translation status signals, virtual address (request) lines 309, physically address and attribute lines 311 for providing the physical address and attributes from circuitry 137 to circuitry 117. Bus 151 further includes virtual address (update) lines 313, entry number lines 315, and TLB update lines 316. In other embodiments, the coupling between circuitry 117 and 137 may have other configurations. For examples, in other embodiments, the different information may be carried on common bus lines according to a communications protocol. Also in other embodiments, information may be communicated serially.

Debug circuitry 117 also includes a control register 304 and control circuit 303 for controlling the operations of debug circuit 117.

In one embodiment, circuitry 117 and 137 are implemented as hardwired circuitry. In some embodiments, circuitry 117 and/or 137 may be implemented with a processor executing software or firmware. Still in other embodiments, debug circuitry 117 and 137 may be implemented as an integrated unit.

Figure 4:
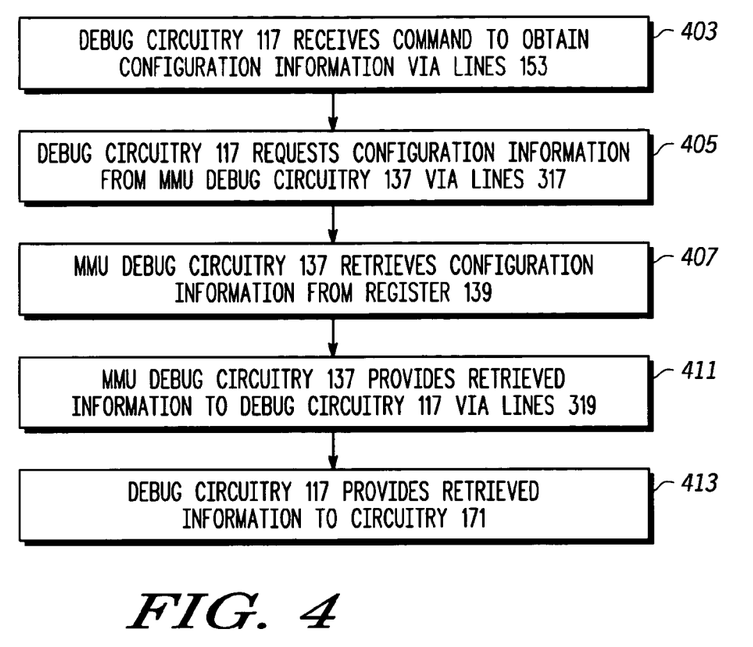
FIG. 4 is flow diagram of one process for obtaining translation information accordingly to one embodiment of the present invention.

FIG. 4 is a flow diagram for obtaining translation configuration information from MMU 105 during a debug process according to one embodiment of the present invention. In operation 403, debug circuitry 117 receives a command via lines 153 from circuitry 171 to obtain MMU configuration information from MMU 105. In one embodiment, commands are provided to debug circuitry 117 by writing commands to control register 304 of debug circuitry 117. In one example, debug circuitry 117 is capable of performing various operations for requesting information. Commands generated by circuitry 171 would be used to request the various types of information. See the ISTO-5001 NEXUS standard for examples of some of these commands.

In operation 405, debug circuitry 117 requests the configuration information from MMU debug circuitry 137 via command lines 317. In one embodiment, circuitry 117 is capable of generating different types of commands to retrieve different types of information. In operation 407, MMU debug circuitry 137 retrieves configuration information from register 139. In operation 411, MMU debug circuitry 137 provides the retrieved configuration information to debug circuitry 117 via lines 319. In operation 413, debug circuitry 117 provides the retrieved information to circuitry 171.

The operations for obtaining translation information depicted in the flow diagram of FIG. 4 (as well as depicted in the flow diagrams of FIGS. 5-8) may be performed transparent to the operation of processor core 103. As used herein, obtaining translation information "transparent to the operation of a processor core" means that translation information can be obtained without interrupting or disrupting processing operations of a processor core. For example, referring to FIG. 1, translation information may be obtained without halting or interrupting the execution of processor instructions by processor core 103, since the information is obtained unobtrusively by MMU debug circuitry 137. Obtaining translation information transparent to the operation of a processor core may allow, in some embodiments, for real-time debugging to occur unobtrusively.

One advantage of a system that is able to obtain configuration information (or other types of translation information) transparent to the operation of the processor core is that it may allow a debugging system to view such information without utilizing a processor operation and thus without interrupting normal operation of the processor to obtain such information.

The configuration information that is retrieved can be used by the debugging system to indicate to the user what capabilities are supported by MMU 105. The information can further be used to assist the debugger in performing additional information requests to be described with reference to FIGS. 5-9.

Figure 5:
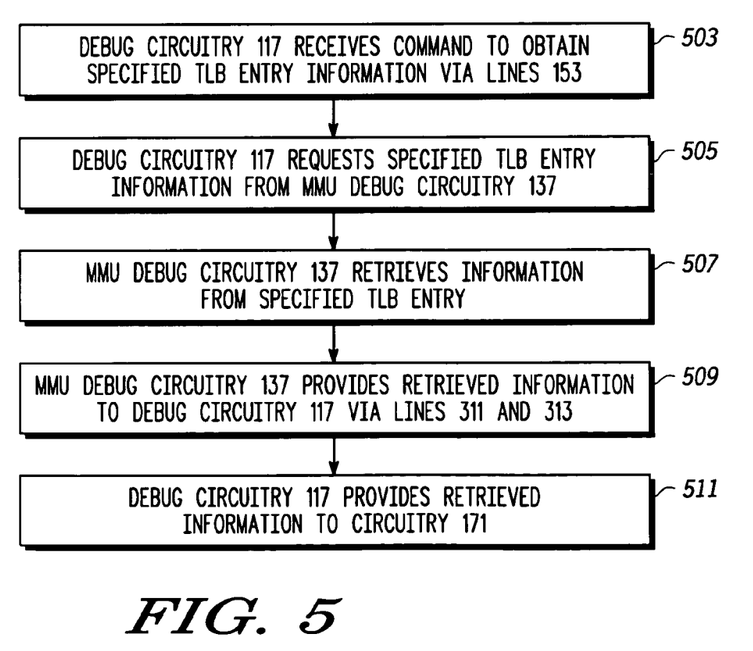
FIG. 5 is flow diagram of one process for obtaining translation information accordingly to one embodiment of the present invention.

FIG. 5 is a flow diagram of operations for obtaining translation information from a specified TLB entry of a TLB. In operation 503, circuitry 117 receives a command from circuitry 171 to obtain the translation information from a specified entry of a TLB. In one example, the command would include a request to obtain all translation information associated with a specific entry (e.g. the $10^{th}$ entry) of a specific TLB (e.g. TLB0 or TLB1 in the embodiment shown). In some embodiments, the request for information from a specific entry may be included in a request for translation information for a range of entries (e.g. entries 15-30). In still another example, a command would include a request to obtain specific translation information (e.g. attributes, physical address) for a specified entry. Such information can then be provided to the user of the debugger to inform the user of at least a partial state of the translation mapping being performed by MMU 105, and thus assist in reconciling the relationship between the virtual addresses associated with program code and data variables, and the actual physical location of that code and data within data processing system 101, which may not remain constant or fixed as the system executes applications. Some virtual memory systems will typically remap information dynamically as resources are requested and released.

In operation 505, debug circuitry 117 requests the specified TLB entry information from MMU debug circuitry 137 via command lines 317 and entry number lines 315. In operation 507, MMU debug circuitry 137 retrieves the information from the specified TLB entry or entries in the specified TLB. In operation 509, MMU debug circuitry 137 provides retrieved information to debug circuitry 117 via lines 311 and lines 313 (depending upon the specified information). Such information may include the entry's virtual and physical address fields along with attributes and validity information as shown in FIG. 2. In operation 511, debug circuitry 117 provides the retrieved information to circuitry 171.

Figure 6:
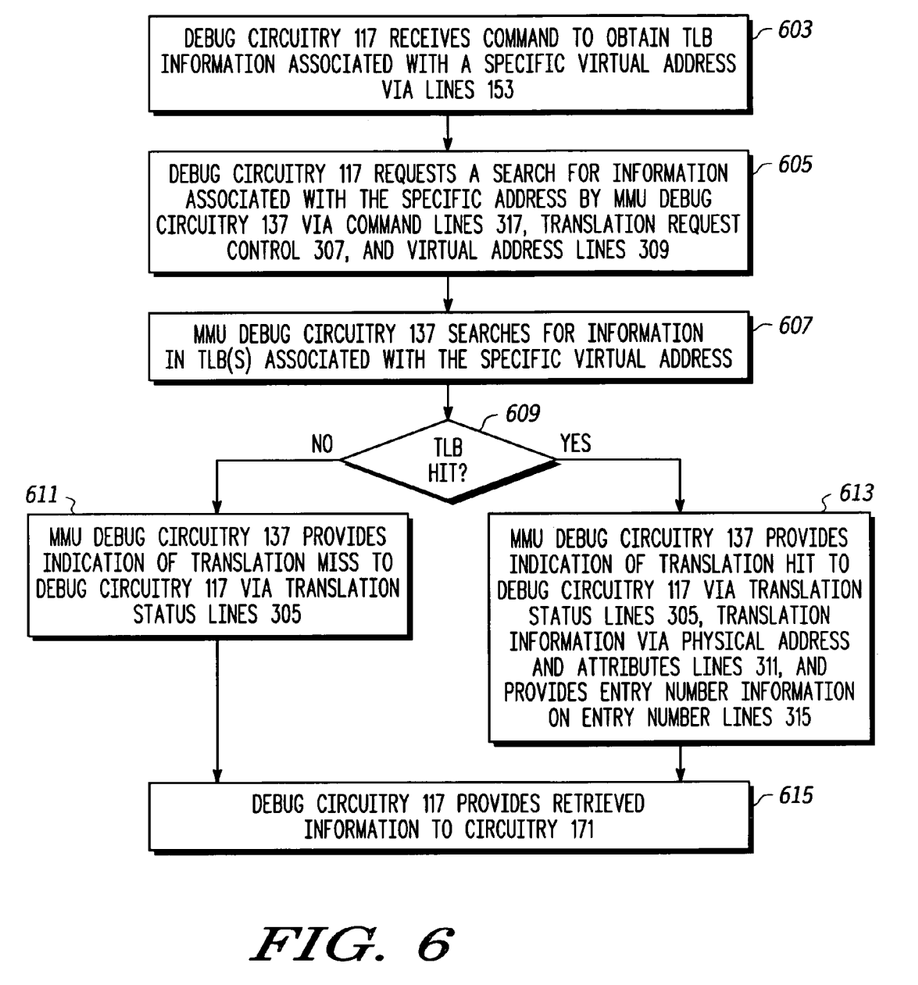
FIG. 6 is flow diagram of one process for obtaining translation information accordingly to one embodiment of the present invention.

FIG. 6 is a flow diagram for obtaining information for a specific virtual address or addresses. In operation 603, debug circuitry 117 receives a command from circuitry 171 via terminals 154 to obtain TLB information associated with a specific virtual address. In one embodiment, the command may be to obtain all TLB information for a specified address. In other embodiments, the command may be to obtain specified TLB information (e.g. attributes, physical address) for a particular virtual address. In one embodiment, the command may be to obtain information from a specific TLB. In other embodiments, the command may be to obtain information from all TLBs within MMU 105. In one embodiment, a request to obtain TLB information for a virtual address may be included in a request to obtain TLB information in a range of virtual addresses. In one embodiment, the command provided by circuitry 117 would be a command to obtain information from multiple addresses. The command includes a number indicating the range of addresses to use from the address provided on lines 309.

In operation 605, debug circuitry 117 requests a search for information associated with the specific virtual address by MMU debug circuitry 137 via command lines 317, translation request control lines 307, and virtual address lines 309. In one embodiment, a command indicating a request is provided on command lines 317, the type of translation is provided on translation request control lines 307, and the specific virtual address is provided on virtual address lines 309.

In operation 607, MMU debug searches its TLBs for information associated with the specified virtual address. In one embodiment, it searches the virtual address field 209 of each TLB (or a specified TLB depending on the type of translation request) for the specified virtual address.

If in 609 a determination is made that no TLB of MMU 105 includes an entry for the virtual address, MMU debug circuitry 137 provides an indication of a translation miss to debug circuitry 117 via status lines 305 in operation 611. If in 609 a determination is made that a TLB has an entry for the specified virtual address (referred to as a TLB hit), MMU debug circuitry 137 provides an indication of a translation hit to debug circuitry 117 via translation status line 305 and provides the translation entry information to debug circuitry 117 via physical address and attributes lines 311 in operation 613. In one embodiment, the entry number(s) of the hitting entry(s) may also be provided by MMU debug circuitry 137 to debug circuitry 117 via entry number lines 315 in operation 613.

In operation 615, debug circuitry 137 provides the retrieved information (or indication of the TLB miss) to circuitry 171 via lines 153 and terminals 154.

By obtaining translation information associated with a specific virtual address, or a ranges of specified virtual addresses, the debugger of system 101 may properly correlate the real-time debug information provided as part of the operation of a real-time trace information standard such as ISTO-5001 NEXUS, in which debug messages are generated by the data processor containing address and data information for either program events (Program Trace Messaging), or data events (Data Read Messaging, Data Write Messaging), as well as other debug information. These messages include physical address information. By correlating the physical address information contained in the real-time trace information to corresponding virtual addresses used by the programmer of the application being executed by data processing system 101, this address and data information can be formatted by the debugger and presented to the user of the debugger. Correlation of the physical address information obtained by real-time trace messages to the virtual addresses of the program undergoing execution may be an important part of the debugging process, so that actual program flow and the dynamic values of system data variables can be properly and easily monitored.

Figure 7:
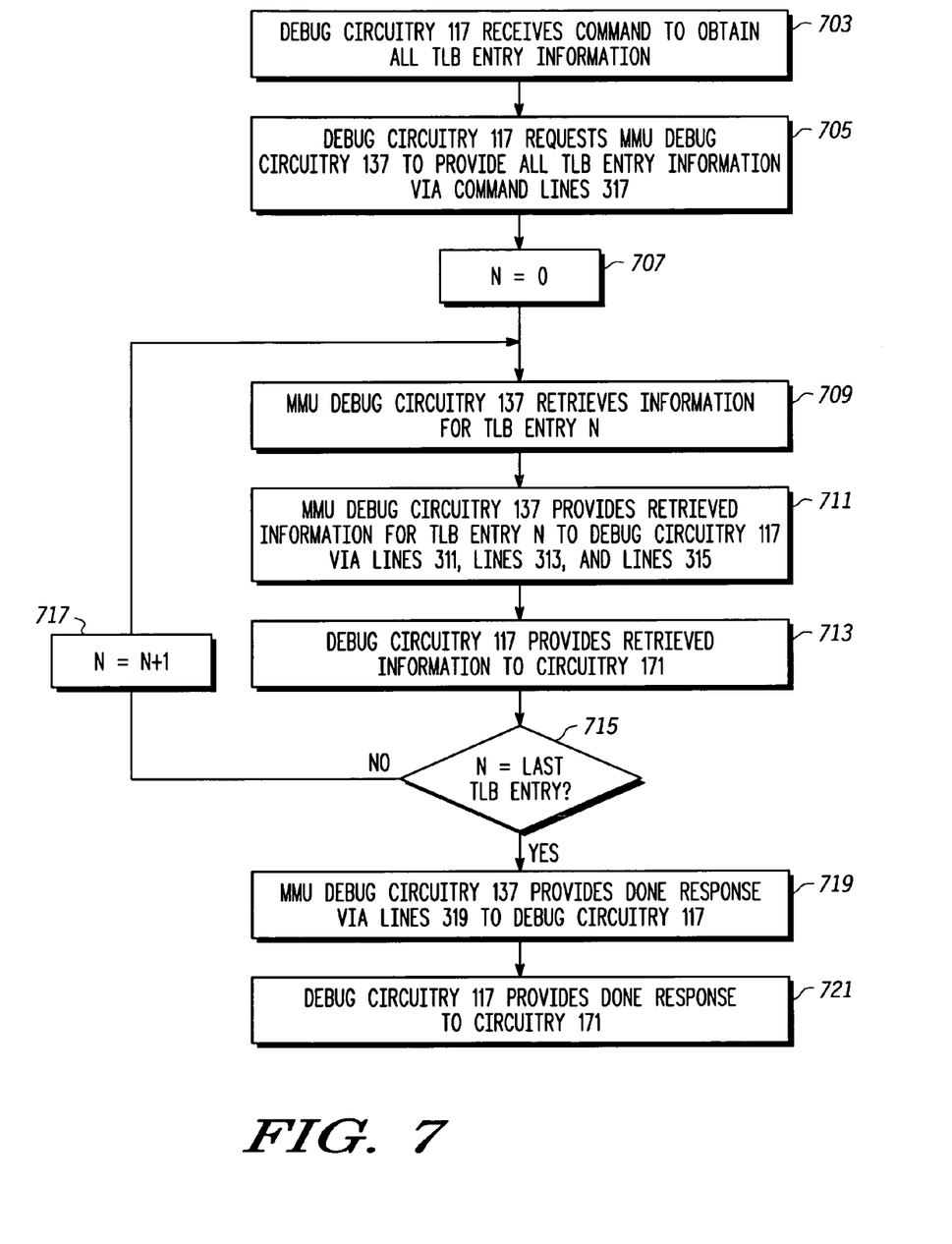
FIG. 7 is flow diagram of one process for obtaining translation information accordingly to one embodiment of the present invention.

FIG. 7 shows a flow diagram for obtaining all information from a TLB, independent of specific virtual address(es). In this embodiment, it may be desirable for a programmer to obtain all translation information of a data processing system, so that the complete state of one or more TLBs of MMU 105 may be examined by the debugger of system 101.

In operation 703, debug circuitry 117 receives a command from circuitry 171 to obtain all TLB entry information from a TLB of a MMU. In one embodiment, a request to obtain information all information from one TLB of an MMU may be included in a command to obtain all information from all TLBs of an MMU. In some embodiments, the command may be to obtain all information of specific fields of a TLB (e.g. physical address, attributes) or TLBs.

In operation 705, debug circuitry 117 requests MMU debug circuitry 137 to provide all TLB entry information of a TLB (or all TLBs of MMU 105) via command lines 317.

In the embodiment shown in FIG. 7, the entry information is provided on an entry by entry basis. However, the entry information maybe provided to circuitry 117 by other techniques in other embodiments. In operation 707, the current entry (designated as N) to be provided is set to 0 (the first entry) by MMU debug circuitry 137. In operation 709, MMU debug circuitry 137 retrieves the information for TLB entry for the current entry (N). In operation 711, MMU debug circuitry 137 provides the retrieved information for the current TLB entry (N) to debug circuitry 117 via lines (physical address and attributes), lines 313 (virtual address), and lines 315 (entry number). In some embodiments, a hand shake procedure is set up where circuitry 117 provides a "received command" in response to receiving the information of each entry. In response to the "received command," circuitry 137 provides the information for the next entry. In other embodiments, no handshake procedure is utilized.

In operation 713, debug circuitry 117 provides the retrieved information from entry N to circuitry 171. In some embodiments, operation 713 may be performed by a handshake process.

In operation 715, MMU debug circuitry 137 makes a determination of whether the current entry N is the last entry of a TLB (or the last entry of the last TLB of an MMU). If the determination is no in operation 715, the current entry N is incremented to the next entry number in operation 717 and operations 709, 711, 713, and 715 are repeated for additional entries until a determination is made that the information has been retrieved for the last TLB entry in operation 715. If the determination is yes in operation 715, MMU debug circuitry 137 provides a "done" response via lines 319 to debug circuitry 117 in operation 719. Debug circuitry 117 provides a done response to circuitry 171 indicating that all of the information has been provided in operation 721.

In other embodiments, debug circuitry 117 may include memory (not shown) for buffering translation information before being provided to circuitry 171. Accordingly, in some embodiments, translation information maybe provided to circuitry 171 at a different time or under a different looping scheme than the information is provided from MMU debug circuitry 137 to debug circuitry 117.

Figure 8:
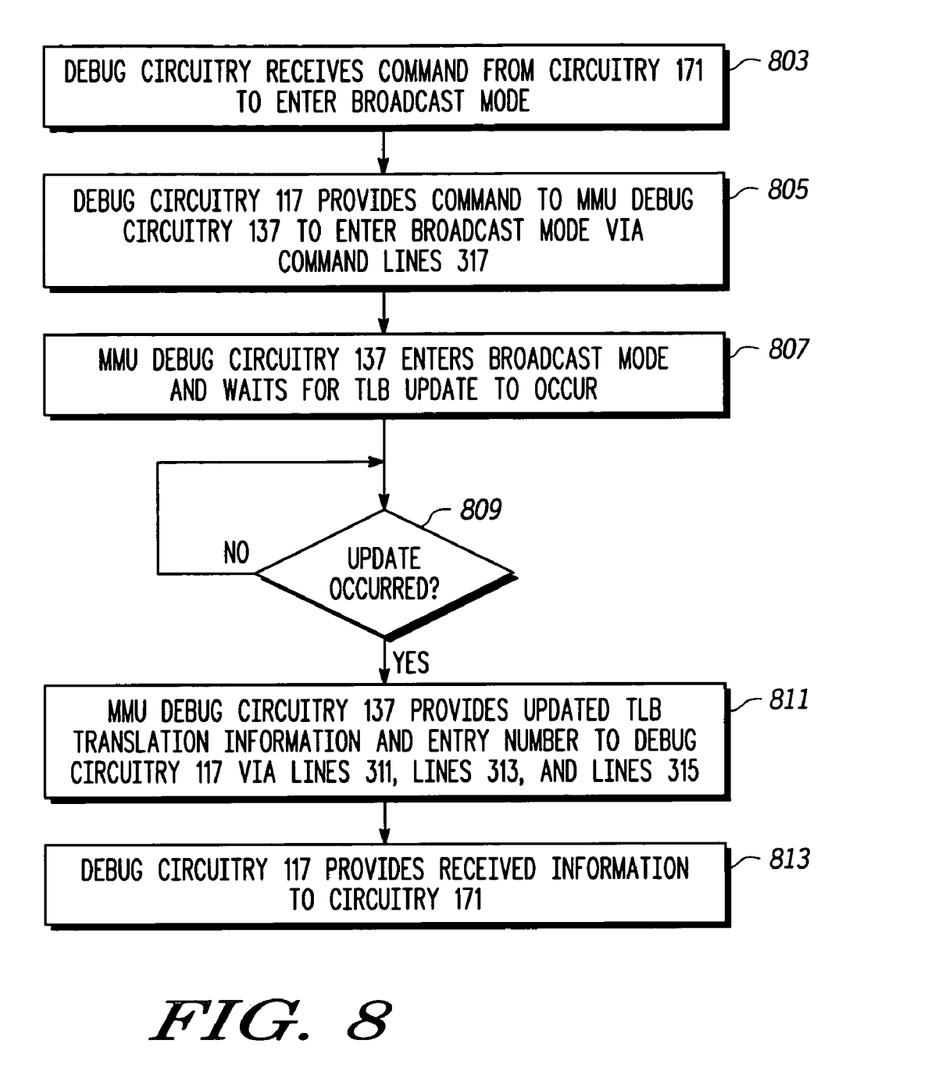
FIG. 8 is flow diagram of one process for obtaining translation information accordingly to one embodiment of the present invention.

In some embodiments, MMU debug circuitry 137 and debug circuitry 117 may be configured or placed in a mode to broadcast all changes in TLB information as the system executes. In such a mode, any updates to the TLB(s) will be automatically provided to circuitry 171. One advantage of this mode is that it may speed up the debugging process, since the current state of the TLB(S) can be automatically tracked by circuitry 171 and provided to the debugger of system 101 without the need to periodically query the state of MMU 105.

In 803, debug circuitry 117 receives a command from circuitry 171 to enter a broadcast mode. In operation 805, debug circuitry 117 provides a command via command lines 317 to MMU debug circuitry 137 to enter into a broad cast mode. In operation 807 MMU debug circuitry 137 enters a broadcast mode and waits for an update to a TLB to occur.

An update to a TLB may occur for a number reasons including the writing or invalidation of data or instructions from a cache e.g. 134, the remapping of data or instructions within system 101, a paging operation to transfer information from a non-volatile memory e.g. hard disk drive or CD ROM to a faster volatile memory (e.g. RAM) during the operation of data processing system 101, or invalidation of a TLB entry.

If in operation 809 an update is determined to have occurred, in operation 811 MMU debug circuitry 137 provides updated TLB translation information including the entry number of the updated information to debug circuitry 117 via lines 311 (physical address and attributes), lines 313 (virtual address), and lines 315 (entry number). Debug circuitry 117 provides received information to circuitry 171 in operation 813.

In some embodiments, circuitry 137 would be configured to automatically provide any updated TLB information to circuitry 117 without having to be placed in a broadcast mode. In some embodiments, circuitry 117 would be configured to automatically provide any updated TLB information to circuitry 171.

Providing a processor with circuitry that can broadcast updates of translation information without interfering with processor operations may provide for a more efficient debugging process. Furthermore it can provide an indication of an update to the TLB automatically, there by alerting the debugging circuitry that there has been an update. An advantage that may occur with this mode is that it may speed up the debugging process, since the current state of the TLB(s) can be automatically tracked by circuitry 171 and provided to the debugger of system 101 without the need to periodically query the state of MMU 105.

In some embodiments, processor operations may be utilized to obtain translation information. In one embodiment, debug circuitry 137 would generate an interrupt to processor core 103 to obtain requested translation information. Such interrupts could be utilized to obtain requested information if the requested translation information is not present in MMU 105 and must be provided external to processor 102.

In one embodiment, the interrupt to obtain requested translation information is a low priority interrupt that would be serviced after other higher priority tasks have been completed. In one embodiment, the interrupt is a vectored interrupt where circuitry 137 provides the vector to processor core 103 with an interrupt signal on lines 152. In some embodiments, interrupt priority of the requesting interrupt may be programmable within a range of interrupt priority levels. In one embodiment, an interrupt may be generated with a specified priority level. However, other types of interrupts may be performed in other embodiments. In some embodiments, an interrupt may be generated by circuitry 137 via other circuitry (not shown) having an output connected to an interrupt line of processor core 103. In one embodiment, an interrupt may be generated by debug circuitry 117 (or by an interrupt generating circuit coupled to debug circuitry 117) when translation information is requested by circuitry 171.

In one embodiment, in response to an interrupt, processor core 103 suspends the current execution stream and obtains the translation information by executing processor operations as part of an interrupt handling routine performed by processor core 103.

In other embodiments, translation information may be obtained by processor core 103 by utilizing program threads. A program thread is a path of instructions that constitute an executable program to complete a task or series of tasks. An operating system may control the execution of a number of program threads which may be executed to accomplish various tasks. A program thread may be activated when the processor core is examining a list of tasks in priority order to determine whether they should be activated. During the operation of a data processing system, an operating system may periodically check whether a request for activation of a thread has been made based on the priority of the thread.

In one embodiment, initiation of a new program thread may be generated by debug circuitry 117 or by MMU debug circuitry 137 (or by an interrupt generating circuit—coupled to debug circuitry 117 or MMU debug circuitry 137 in some embodiments) when translation information is requested by circuitry 171. In one embodiment, in response to generation of a new program thread, the new thread is added to the list of active threads requesting execution.

In one embodiment, the thread priority is programmable to a predetermined priority level. For example, the thread priority may be programmed to a lower value than other threads that are more time critical such that it may is executed with a lower priority (e.g. at a priority level just above the idle thread) such that it minimally affects processor core operation. In one embodiment, threads of higher priority would be checked first for activation with lower priority threads being checked after a determination that higher priority threads have not been requested for activation.

In one embodiment, a request for activation of a thread is made by circuitry 137 by writing a specified value to a request register (not shown) of processor core 103 via bus 151. In other embodiments, activation of a thread may be requested in other manners. In one embodiment, as part of thread activation, a thread priority may be provided along with the request for activation. In other embodiments the thread priority may be predetermined by examining the state of a control register field, or may be hardwired to a specific value.

Figure 9:
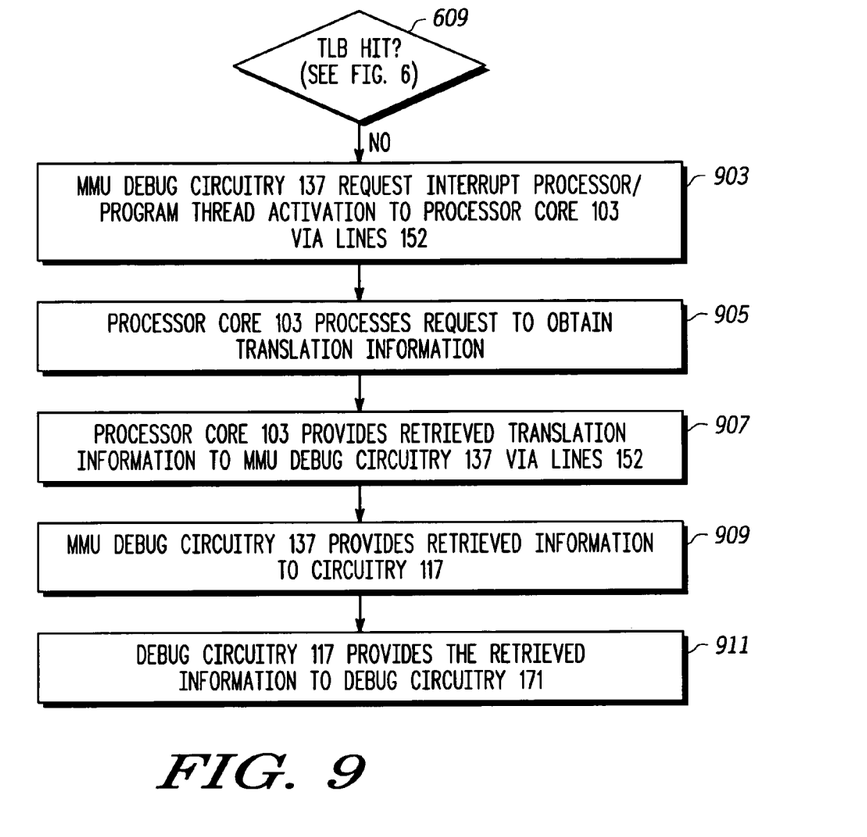
FIG. 9 is flow diagram of one process for obtaining translation information accordingly to one embodiment of the present invention.

FIG. 9 sets forth a flow diagram showing modifications of the operations of FIG. 6 for implementing the use of processor core operations (e.g. a program thread or interrupt handling routine) to obtain translation information by a processor core. In the embodiment shown, the operations of FIG. 9 are performed if the requested translation information for a specific virtual address is not found in a TLB of MMU 105 by circuitry 137 (indicated as "no" in operation 609 of FIG. 6).

If no in operation 609, circuitry 137 requests activation of a program thread responsible for obtaining the translation information or generates an interrupt to processor core 103 via lines 152. In one embodiment, the program thread or interrupt has a predetermined priority. In other embodiments the priority may be provided by MMU debug circuitry 137 along with the request, utilizing lines 152.

In response, the processor core 103 activates the program thread or performs an interrupt handling routine to obtain the requested translation information in operation 905. The activation of the thread or the generation or handling of an interrupt is based on the priority level of the thread or interrupt. In one embodiment, code 116 for performing the program thread or for the interrupt handling routine is stored in memory 115 during operation, but may be written to a cache during operation as well. In one embodiment, the code 116 may be stored in ROM or other non-volatile memory (e.g. designated as other circuitry 113 in FIG. 1).

Processor core 103, executing a program thread or interrupt handling routine, may obtain translation information in a number of ways. In one embodiment, the translation information is obtained by searching a hierarchy of tables (e.g. page tables 118) in memory 115 containing translation information. In one embodiment, the searching of the hierarchy of tables can be performed by table walking, either by a hardware state machine in MMU 105 (not shown) or by processor operations performed by core 103.

In operation 907, processor core 103 provides the retrieved translation information to MMU debug circuitry 137 via lines 152. In another embodiment, processor core 103 writes the requested information to a register in MMU debug circuitry 137 via the memory bus (data lines 122 and virtual address lines 107). In such an embodiment, MMU debug circuitry 137 may includes registers having a designated I/O or memory address. Processor core 103 then continues with the execution of the next selected thread or continue with the interrupted processes.

In operation 909, MMU debug circuitry 137 provides the requested translation information to debug circuitry 117 via bus 151. In operation 911, debug circuitry 117 provides the retrieved translation information to debug circuitry 171.

In other embodiments, debug circuitry 117 may generate an interrupt to processor core 103 or cause the activation of the program thread in processor core 103. Also, in other embodiments, processor core 103 may provide the information directly to debug circuitry 117 without writing it to MMU 105.

One advantage of using lower priority programmed threads or lower priority interrupts to obtain translation information by a processor core is that the translation information retrieval may be performed with a minimal amount of interference to normal processor core operation. In some cases, the retrieval may be performed during time when the processor core is idle.

In one embodiment, the interrupt level of the interrupt for obtaining translation information is programmable or the thread priority level is programmable. In one embodiment, the retrieval of priority information is programmable. Thus, the level of priority may be changed dynamically. In some embodiments, this priority modification is be done by a command received by debug circuitry 117 from lines 153 or is done as a result of a processor 102 operation. In other embodiments, the priority modification may be performed by another component of system 101.

Retrieved translation information may be used by circuitry 171 for debugging code being executed by processor core 103. This code being debugged may be part of a computer program that then would be loaded onto an another electronic system that includes a data processing system similar to data processing system 101.

Figure 10:
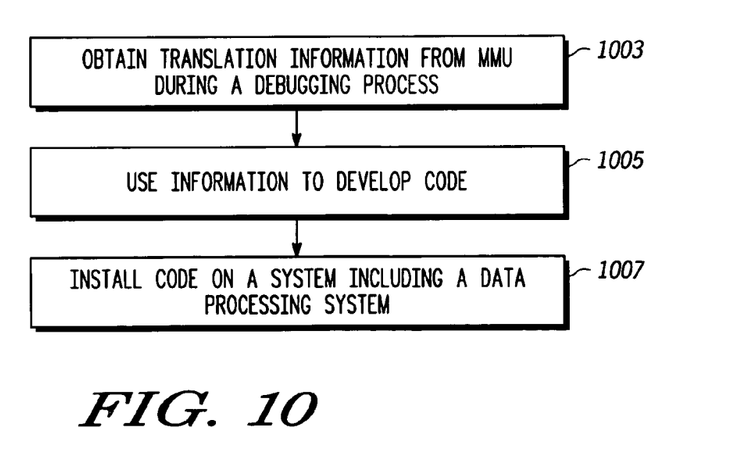
FIG. 10 is a flow diagram of one embodiment for developing and installing code on a data processing system utilizing the information obtained in a debugging process according to the present invention.

FIG. 10 is a flow chart setting forth a process showing how translated information obtained by MMU 105 during a debug process is used to develop code for installation on another data processing system.

In operation 1003, the information is obtained from MMU 105 and eventually provided to circuitry 171. In operation 1005, the translation information is used to develop program code (e.g. application or system code). In one embodiment, the translation information is used to debug the code that the processor core 103 is executing.

In operation 1007, the developed program code is installed on a data processing system (e.g. similar to data processing system 101) for use by that system. In one embodiment, the code is loaded onto the data processing system as part of the manufacturing process (e.g. as with a cell phone or factory installed computer software). In other embodiments, the code may be part of an aftermarket software application purchased by the user of the data processing system.

Data processing systems of other embodiments may have other configurations. For example in some embodiments, circuitry 117 may be omitted where the debug circuitry 171 obtains information from MMU debug circuitry 137 directly. In other embodiments, circuitry 137 may be omitted and circuitry 117 may obtain the information from MMU 105. Still in other embodiments, circuitry 117 and 137 may be combined.

One embodiment includes a method for obtaining translation information from a data processor. The data processor includes a processor core and memory management circuitry. The method includes requesting, by circuitry external to the data processor, translation information from the memory management circuitry. The translation information is utilized in performing processor operations of the data processor. The method includes determining whether the requested translation information is present within memory management circuitry wherein the determining is performed transparent to the operation of the processor core. The method also includes if the requested translation information is determined not to be present within the memory management circuitry, requesting retrieval of the requested translation information by the processor core.

In another embodiment, a data processing system includes a data processor. The data processor includes a processor core and memory management circuitry operably coupled to the processor core. The memory management circuitry stores translation information. The translation information is utilized in performing processor operations of the data processor. The data processing system also includes debug circuitry. The debug circuitry is configured to obtain translation information from the memory management circuitry transparent to the operation of the processor core and coupled to provide obtained translation information external to the data processor. The debug circuitry is operably coupled to the processor core to request the retrieval of translation information by the processor core.

Another embodiment includes a method of debugging a data processor. The data processor includes a processor core and memory management circuitry. The processor core and memory management circuitry are implemented in an integrated circuit. The method includes requesting, by circuitry external to the integrated circuit, translation information from the memory management circuitry. The method also includes determining whether the requested translation information is present within the memory management circuitry. The determining is performed without utilizing a processor core operation. The method further includes if the requested translation information is determined not to be present within the memory management circuitry, requesting retrieval of the requested translation information by the processor core. The method also includes retrieving the requested translated information by the processor core in response to the requesting retrieval and providing the requested translation information retrieved by the processor core to the circuitry external to the integrated circuit via at least one external debugging terminal of the integrated circuit. The method further includes using the translation information retrieved by the processor core to debug code being executed by the processor core.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. A method for obtaining translation information from a data processor, the data processor including a processor core and memory management circuitry, the method comprising:
    requesting, by circuitry external to the data processor, translation information from the memory management circuitry, wherein the translation information is utilized in performing processor operations of the data processor, wherein the requesting is performed transparent to the operation of the processor core, wherein the requesting includes debug circuitry providing a request for the translation information to the memory management circuitry;
    determining whether the requested translation information is present within memory management circuitry wherein the determining is performed transparent to the operation of the processor core;
    if the requested translation information is determined not to be present within the memory management circuitry, requesting retrieval of the requested translation information by the processor core.

2. The method of claim 1 wherein the requesting retrieval includes generating an interrupt to the processor core.

3. The method of claim 2 wherein the processor core handles interrupts of different priority levels, wherein the generating an interrupt includes generating an interrupt of a lower priority level.

4. The method of claim 1 wherein the requesting retrieval includes requesting an activation of a program thread to be executed by the processor core.

5. The method of claim 4 wherein the processor core executes program threads of different priority levels, wherein the activation of the program thread includes the activation of the program thread of a lower priority level.

6. The method of claim 4 wherein a priority level of the program thread is programmable.

7. The method of claim 1 wherein the requesting retrieval includes indicating a priority level of the retrieval by the processor core.

8. The method of claim 1 further comprising:
    the processor core retrieving the requested translation information;
    providing the requested translation information external to the data processor.

9. The method of claim 8 wherein the data processor is implemented on an integrated circuit, the method further comprising:
    providing the requested translation information external to the integrated circuit.

10. The method of claim 9 wherein the requesting translation information from the memory management circuitry is generated external to the integrated circuit.

11. The method of claim 9 wherein the integrated circuit includes at least one external debug terminal, wherein the requested translation information is provided external to the data processor via the at least one external debug terminal.

12. The method of claim 1 wherein the requesting retrieval by the processor core is performed by debug circuitry located within the data processor.

13. The method of claim 1 wherein the requesting retrieval of the requested translation information by the processor core is performed by circuitry of the memory management circuitry.

14. The method of claim 1 wherein:
    the requesting translation information includes a request for translation information associated with a virtual address.

15. The method of claim 14 wherein the request includes a request for a physical address information associated with the virtual address.

16. A data processing system comprising:
    a data processor, the data processor including:
        a processor core;
        memory management circuitry operably coupled to the processor core, the memory management circuitry storing translation information, wherein the translation information is utilized in performing processor operations of the data processor;
    debug circuitry, wherein the debug circuitry is operably coupled to receive external requests for translation information, wherein the external requests are received external to the data processor, the debug circuitry configured to obtain requested translation information from the memory management circuitry transparent to the operation of the processor core wherein the debug circuitry is configured to request the requested translation information from the memory management circuitry transparent to the operation of the processor core, and the debug circuitry is coupled to provide obtained translation information external to the data processor, the debug circuitry is operably coupled to the processor core to request the retrieval of translation information by the processor core.

17. The data processing system of claim 16 wherein the debug circuitry requests retrieval of translation information by the processor core in response to a determination that the translation information is not present in the memory management circuitry.

18. The data processing system of claim 16 wherein the debug circuitry requests retrieval of translation information by the processor core by generating an interrupt to the processor core.

19. The data processing system of claim 16 wherein the debug circuitry requests retrieval of translation information by the processor core by requesting an activation of a processing thread by the processor core.

20. The data processing system of claim 16 wherein data processor, memory management circuitry, and the debug circuitry are implemented on an integrated circuit, wherein the integrated circuit includes at least one external debug terminal, the debug circuitry operably coupled to the at least one external debug terminal to receive requests for translation information and to provide retrieved translation information including translation information retrieved by the processor core.

21. A method of debugging a data processor, the data processor including a processor core and memory management circuitry, the processor core and memory management circuitry are implemented in an integrated circuit, the method comprising:
  requesting, by circuitry external to the integrated circuit, translation information from the memory management circuitry, wherein the requesting is performed transparent to the operation of the processor core, wherein the requesting includes debug circuitry providing a request for the translation information to the memory management circuitry;
  determining whether the requested translation information is present within the memory management circuitry, wherein the determining is performed without utilizing a processor core operation;
  if the requested translation information is determined not to be present within the memory management circuitry, requesting retrieval of the requested translation information by the processor core;
  retrieving the requested translated information by the processor core in response to the requesting retrieval;
  providing the requested translation information retrieved by the processor core to the circuitry external to the integrated circuit via at least one external debugging terminal of the integrated circuit;
  using the translation information retrieved by the processor core to debug code being executed by the processor core.

* * * * *